United States Patent
Coombe et al.

(10) Patent No.: US 11,560,923 B2
(45) Date of Patent: Jan. 24, 2023

(54) SELF-LUBRICATED ELECTRICALLY CONDUCTIVE BUSHING

(71) Applicant: Schaublin SA, Delemont (CH)

(72) Inventors: David Coombe, Somerset (GB); Maxime Merg, Manspach (FR)

(73) Assignee: Schaublin SA, Delémont (CH)

( * ) Notice: Subject to any disclaimer, the term of this patent is extended or adjusted under 35 U.S.C. 154(b) by 247 days.

(21) Appl. No.: 16/892,348

(22) Filed: Jun. 4, 2020

(65) Prior Publication Data
US 2021/0269146 A1 Sep. 2, 2021

Related U.S. Application Data

(60) Provisional application No. 63/028,095, filed on May 21, 2020, provisional application No. 62/858,438, filed on Jun. 7, 2019.

(51) Int. Cl.
*F16C 17/10* (2006.01)
*F16C 33/24* (2006.01)
*F16C 41/00* (2006.01)

(52) U.S. Cl.
CPC ............ *F16C 17/107* (2013.01); *F16C 33/24* (2013.01); *F16C 41/002* (2013.01); *F16C 2326/43* (2013.01)

(58) Field of Classification Search
CPC ....... F16C 17/107; F16C 33/24; F16C 41/002
See application file for complete search history.

(56) References Cited

U.S. PATENT DOCUMENTS

| | | | |
|---|---|---|---|
| 2,906,925 A | 9/1959 | Yonkers et al. | |
| 5,000,586 A | * 3/1991 | Daxer | F16C 33/24 384/282 |
| 5,516,213 A | 5/1996 | Moriyama et al. | |
| 6,905,248 B2 | 6/2005 | Katagiri et al. | |
| 8,393,791 B2 | 3/2013 | Thornton et al. | |

(Continued)

FOREIGN PATENT DOCUMENTS

| | | |
|---|---|---|
| AT | 392522 B | 4/1991 |
| CN | 105537382 A | 5/2016 |

(Continued)

OTHER PUBLICATIONS

Extended European Search Report Issued in corresponding EP Application No. 20178483.2, dated Oct. 16, 2020, pp. 1-12.

*Primary Examiner* — James Pilkington
(74) *Attorney, Agent, or Firm* — Robinson & Cole LLP

(57) ABSTRACT

A bushing for aircraft landing gear includes a cylindrical wall having an interior surface defining a bore extending between a first and second axial end thereof and a cylindrical recess extending into the interior surface. The bushing includes a cylindrical self-lubricating liner which is substantially flush with the interior surface is disposed in the recess. The cylindrical wall includes a flange that has an annular recess that receives an annular self-lubricating liner that has a planar axial bearing surface. The planar axial bearing surface is coplanar with an inboard axial surface of the flange. The bushing has an electrically conductive path that conducts electrical current and that extends around the cylindrical self-lubricating liner and the annular self-lubricating liner and through the cylindrical wall and the flange.

7 Claims, 11 Drawing Sheets

(56) References Cited

U.S. PATENT DOCUMENTS

| | | | |
|---|---|---|---|
| 8,585,293 B2 | 11/2013 | Jager et al. | |
| 9,445,486 B2 | 9/2016 | Duquette et al. | |
| 9,482,269 B2 | 11/2016 | Fruin et al. | |
| 9,976,209 B2 * | 5/2018 | Ito | C23C 16/0227 |
| 10,053,645 B2 | 8/2018 | Karaki et al. | |
| 11,231,071 B2 * | 1/2022 | Mansfield | F16C 17/12 |
| 2005/0175266 A1 | 8/2005 | Noack et al. | |
| 2014/0339358 A1 | 11/2014 | Swartley et al. | |

FOREIGN PATENT DOCUMENTS

| | | |
|---|---|---|
| FR | 518923 A | 6/1921 |
| FR | 2952146 A1 | 5/2011 |
| WO | 9936193 | 7/1999 |

\* cited by examiner

SELF-LUBRICATED ELECTRICALLY CONDUCTIVE BUSHING

CROSS-REFERENCE TO RELATED APPLICATIONS

This application claims the benefit of U.S. Provisional Patent Application Ser. No. 63/028,095 filed on May 21, 2020, and U.S. Provisional Patent Application Ser. No. 62/858,438 filed on Jun. 7, 2019, each of which is incorporated herein by reference in its entirety.

TECHNICAL FIELD

The device disclosed herein relates to, but is not limited to, bushings for landing gear on modern commercial and military aircraft. Specifically, the disclosure is directed to bushings with self-lubricated liners that do not require re-greasing or other maintenance that provide a path for conducting an electrical current between a moving structure and another structure.

BACKGROUND

Generally, existing landing gear bushings for aerospace applications require periodic maintenance and/or re-greasing. Longer life bushings sacrifice electrical conductivity by containing additional permanent or semi-permanent lubrication. There is a need in the art for a bushing that maintains electrical conductibility without the need for periodic maintenance.

Aircraft must manage weight, structural strength, and electrical currents. These electrical currents are caused by electromagnetic effects (EME) such as lightning strikes to radio towers and static discharge and electrically conductive paths and/or electrical isolation are required. EME, such as lightning, may have large currents and high voltages capable of producing electrical arcing across exposed surfaces. In aircraft made with non-conductive composite materials, good electrical paths are required to dissipate EME energy, and good electrical isolation is required to protect sensitive equipment and fluids. Bonding and grounding requirements such as in wing ice protection systems must also be provided for aircraft electrical systems.

FIG. 3 depicts a prior art grease lubricated bushing 2. This simple bushing 2 has a flange 4 at a first end and a sleeve 6 extending from the flange 4 to a second end. Prior art grease lubricated bushings 2 provide the ability to pass electrical current because there is direct contact between the metal housing, metal bushing 2, and metal shaft. These prior art grease lubricated bushings 2 use an electrically conductive grease. Prior art bushings do not provide an adequate pathway for electric current while retaining a long service life without the need to re-lubricate the bushing.

One material of liner that is employed in existing landing gear is polytetrafluoroethylene (PTFE), which is not electrically conductive. Therefore, known self-lubricating bushings such as PTFE bushings do not conduct electricity therethrough. As such, conduction of electrical current resulting from a lightning strike or static electricity through aircraft hardware may be impeded, causing damage to the bushing or other components.

SUMMARY

There is disclosed herein a bushing system for aircraft landing gear that includes a cylindrical wall which has an interior surface that defines a bore extending between a first axial end and a second axial end thereof. The bearing system includes one or more cylindrical recesses that extend radially outward into the interior surface and are located between the first axial end and the second axial end. One or more cylindrical self-lubricating liners or arcuate segments thereof are disposed in one or more of the cylindrical recesses. A radially inward facing surface of the cylindrical self-lubricating liners are substantially flush with the interior surface that defines the bore. A flange extends radially outward from the cylindrical wall and is located proximate to the first axial end. The flange has an axial width measured between an outboard axial surface to an inboard axial surface of the flange. One or more annular recesses extend into the inboard axial surface of the flange. One or more annular self-lubricating liners that each have a planar axial bearing surface are disposed in one or more of the annular recesses. The planar axial bearing surface annular self-lubricating liners are coplanar with the inboard axial surface. The bushing system has an electrically conductive path that is configured to conduct electrical current (e.g., electrical current has a voltage equivalent to that of a lightning strike) therethrough. For example, the electrically conductive path extends around the cylindrical self-lubricating liners and the annular self-lubricating liners and extends through the cylindrical wall and the flange.

In one embodiment, the interior surface that defines the bore further includes a first bore segment of the interior surface that has a first inside diameter and a second bore segment of the interior surface that has a second inside diameter of a magnitude about equal to the first inside diameter. The recess that extends radially outward and into the cylindrical wall has a third diameter that has a magnitude greater than that of either the first inside diameter and the second inside diameter. In one embodiment, the ratio of the first inside diameter to the third diameter is between 0.90 and 1.00. In one embodiment, the ratio of the second inside diameter to the third diameter is between 0.90 and 1.00.

In one embodiment, the radially inward facing surface of the cylindrical self-lubricating liner has a liner circumferential surface area and the interior surface has a cylindrical wall circumferential surface area. A first contact area ratio is defined by the liner circumferential surface area divided by the cylindrical wall circumferential surface area. The contact area ratio is about 0.40 to about 0.60.

In one embodiment, the first bore segment has a first axial length and the second bore segment has a second axial length and the magnitude of the first axial length and the second axial length are substantially the same.

In one embodiment, the cylindrical self-lubricating liner extends entirely circumferentially within the bore.

In one embodiment, the cylindrical self-lubricating liner extends intermittently (e.g., in discrete circumferential arcuate sub-segments) within the bore.

In one embodiment, the bushing system is installed in landing gear of an Airbus® A-320 aircraft.

In one embodiment, the cylindrical self-lubricating liner has a first axial width, the cylindrical wall extends a second axial width and the ratio of the first axial width to the second axial width is from about 0.50 to about 0.90.

In one embodiment, the annular self-lubricating liner has a first axial thickness, the flange has a second axial thickness T2 and a ratio of the first axial thickness to the second axial thickness is from about 0.20 to about 0.40.

In one embodiment, the planar axial bearing surface of the annular self-lubricating liner has a liner axial surface area A3 and the inboard axial surface of the flange has flange axial surface area. A second contact area ratio is defined by liner axial surface area divided by the flange axial surface area. The second contact area ratio is about 0.40 to about 0.80.

In one embodiment, the cylindrical wall and flange of the bushing system is manufactured from an aluminum-bronze alloy material.

In one embodiment, the cylindrical self-lubricating liner and/or the annular self-lubricating liner is infused with Polytetrafluoroethylene (PTFE) or has PTFE fibers woven therein.

In one embodiment, the bushing system includes a shaft coated with a wear resistant material (e.g., tungsten carbide material or chromium plating) on a portion or all the exterior surface of the shaft. The wear resistant coating on the shaft is in rotational sliding engagement with the radially inward facing surface of the cylindrical self-lubricating liner and with the interior surface of the cylindrical wall.

In one embodiment, the bushing system with the shaft (i.e., with the wear resistant coating on the shaft) has a maximum wear of 0.0003302 cm (0.00013 inches) after 25,000 cycles of operation pursuant to SAE Standard AS81934.

In one embodiment, the bushing system is employed in an aircraft landing assembly which includes a housing that defines a housing bore. For example, the bushing system is arranged in the landing assembly such that the bushing is retained in the housing bore and the electrically conductive path extends through the housing, the cylindrical wall and the flange.

There is further disclosed herein a bushing system for aircraft landing gear. The bushing system includes a cylindrical wall that has an interior surface that defines a bore which extends between a first axial end and a second axial end of the cylindrical wall. One or more cylindrical recesses extend radially outward into the interior surface and are located between the first axial end and the second axial end. The bushing system includes one or more cylindrical self-lubricating liners each being disposed in a respective one of the cylindrical recesses. A radially inward facing surface of the at cylindrical self-lubricating liners are substantially flush with the interior surface defining the bore. The radially inward facing surface of the cylindrical self-lubricating liners have a liner circumferential surface area A1 and the interior surface having a cylindrical wall circumferential surface area A2. The bushing system includes an electrically conductive path configured to conduct electrical current. The electrically conductive path extends around the cylindrical self-lubricating liners. The electrically conductive path extends through the cylindrical wall. The electrically conductive path is defined by a contact area ratio of the liner circumferential surface area divided by the cylindrical wall circumferential surface area A2. The contact area ratio is from about 0.40 to about 0.60.

DETAILED DESCRIPTION

Figure 4:
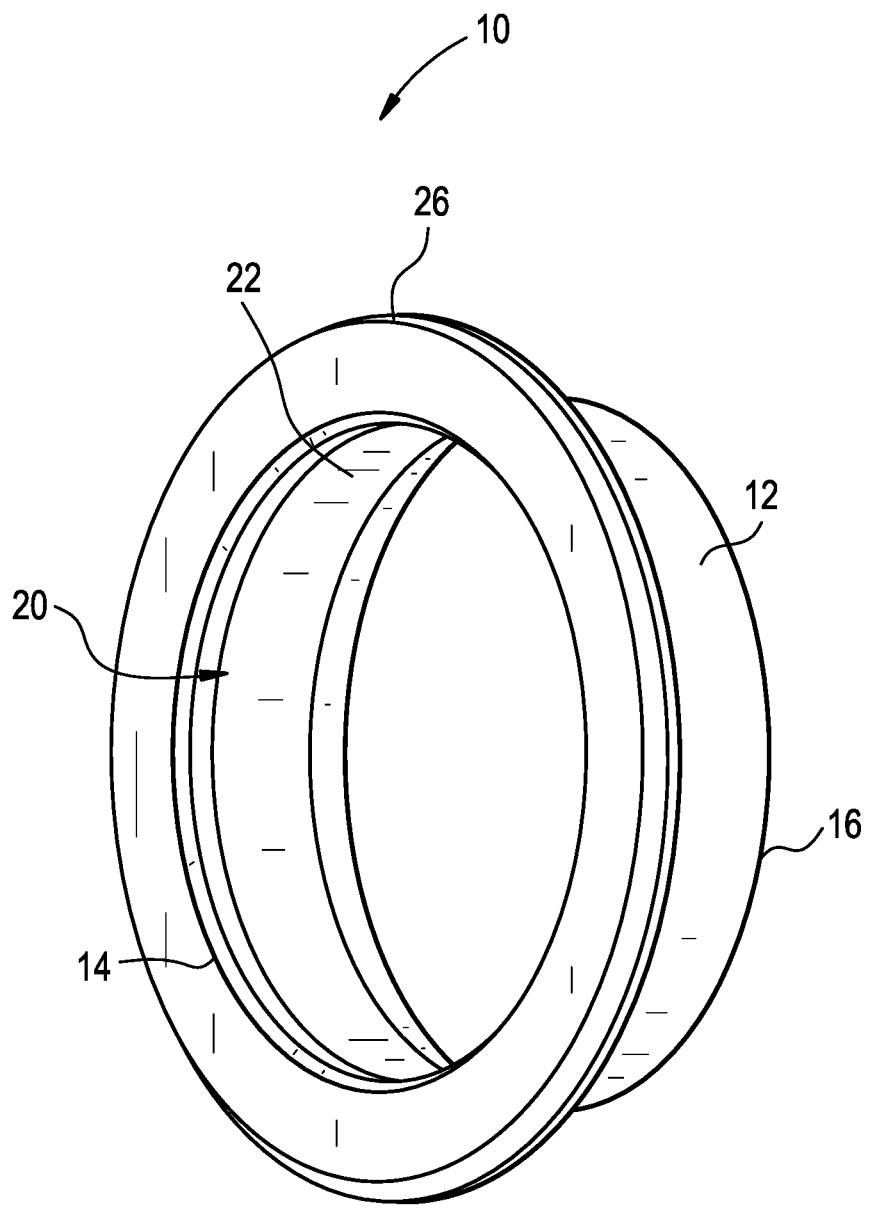
FIG. 4 is an isometric view of an electrically conductive bushing system according to the present disclosure.
Figure 5:
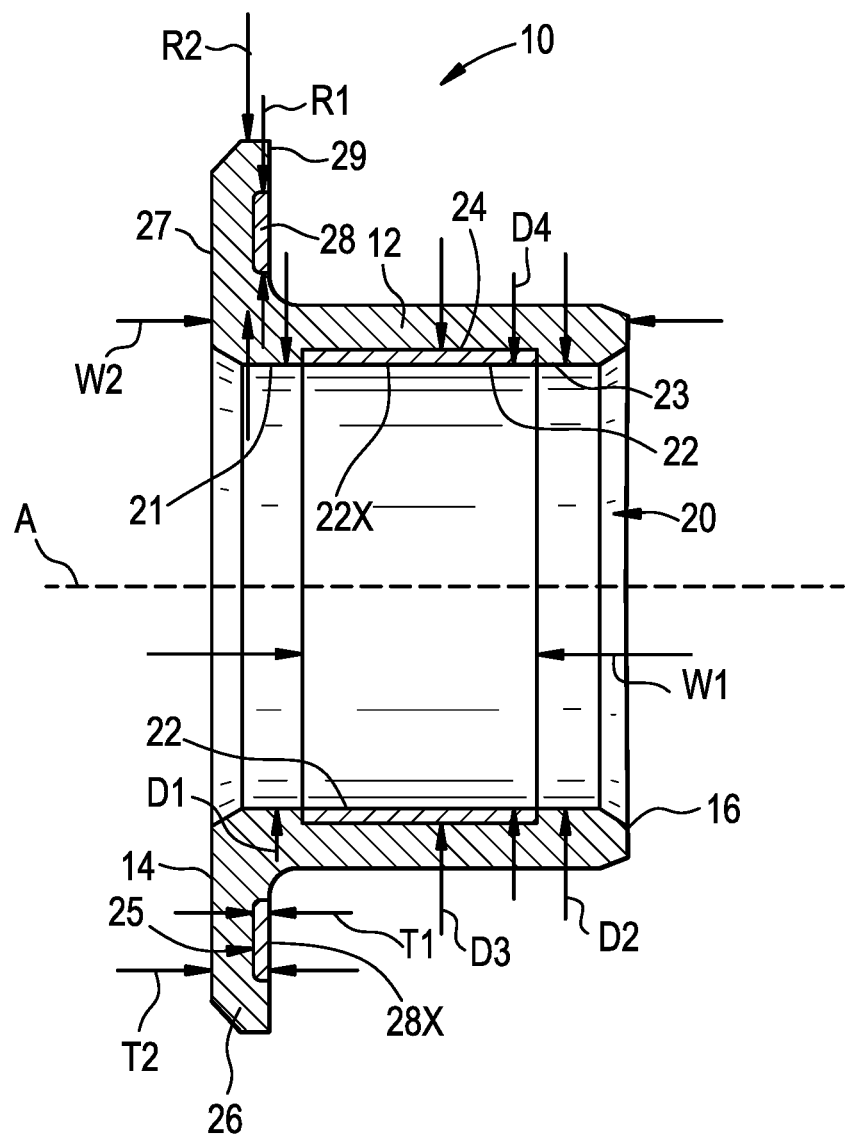
FIG. 5 is a side sectional view of the electrically conductive bushing system of FIG. 4.
Figure 7:
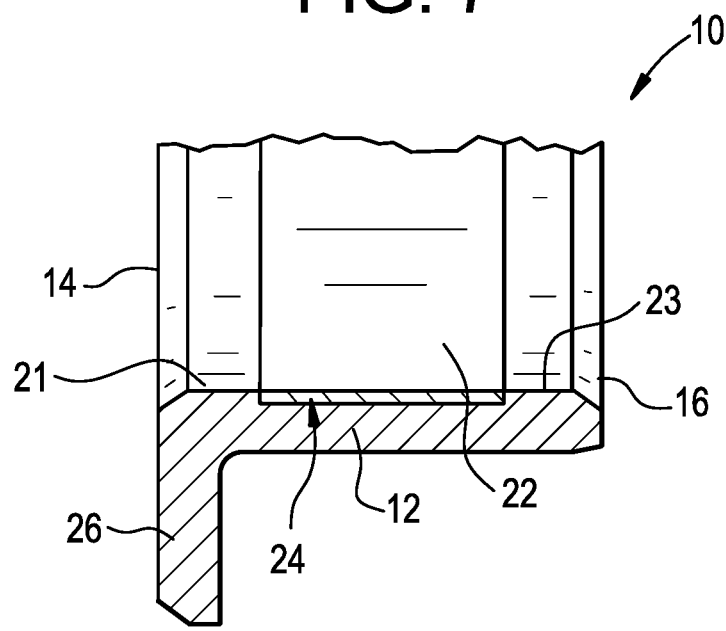
FIG. 7 is a partial side section view of the electrically conductive bushing system of FIG. 4.

Referring to FIGS. 4, 5 and 7, the bushing system of the present invention is designated by element number 10. The bushing system 10 includes a cylindrical wall 12 that extends from (e.g., between) a first axial end 14 to a second axial end 16 of the bushing system 10. The cylindrical wall 12 defines interior surfaces 21, 23 that define a bore 20. The interior surface 21 extends axially inward from the first axial end 14 and the interior surface 23 extends axially inward from the second axial end 16. As best shown in FIG. 5, a cylindrical recess 24 (e.g., an annular groove) extends radially outward into the interior surfaces 21, 23 and is located between the first axial end 14 and the second axial end 16. The interior surfaces 21, 23 are shown having approximately equal axial lengths, but the present invention is not limited in this regard as the interior surfaces 21, 23 may have different axial lengths. The cylindrical recess 24 extends continuously (i.e., uninterrupted) circumferentially in the cylindrical wall 12. A cylindrical self-lubricating liner 22 is disposed (e.g., secured, press fit, adhesively bonded or molded) in the cylindrical recess 24. The cylindrical self-lubricating liner 22 extends continuously (i.e., uninterrupted) circumferentially in the cylindrical recess 24. A radially inward facing surface 22X of the cylindrical self-lubricating liner 22 is substantially flush with the interior surface 21, 23 that define the bore 20.

In the embodiment depicted in FIGS. 4, 5 and 7, the cylindrical self-lubricating liner 22 is axially centered in the bore 20 to allow the cylindrical self-lubricating liner 22 to carry a significant portion of the load transferred by a pin or shaft 40 (depicted in FIGS. 2 and 6) and to provide an adequate lubrication system. The cylindrical self-lubricating liner 22 is a single cylindrical surface that is continuous axially and circumferentially within the cylindrical recess 24.

Figure 8A:
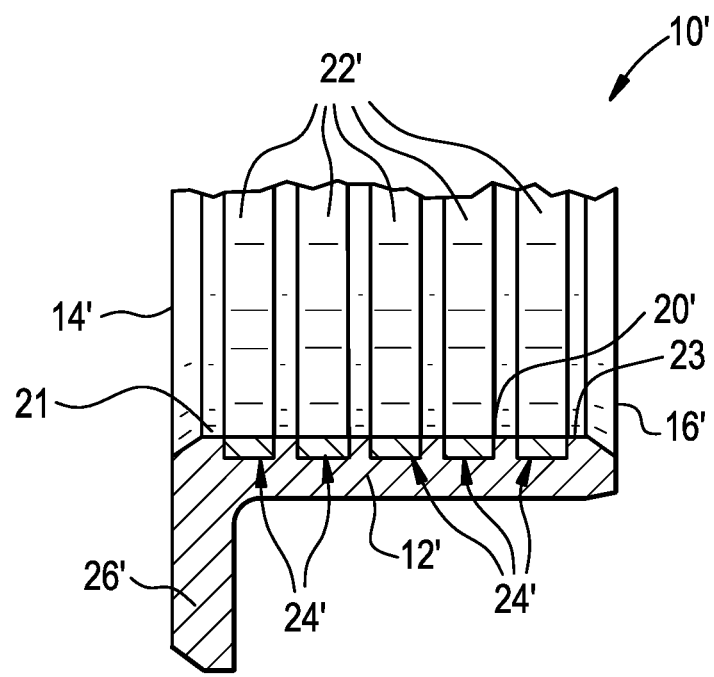
FIG. 8A is a partial side section view of another embodiment of an electrically conductive bushing system according to the present disclosure.
Figure 8B:
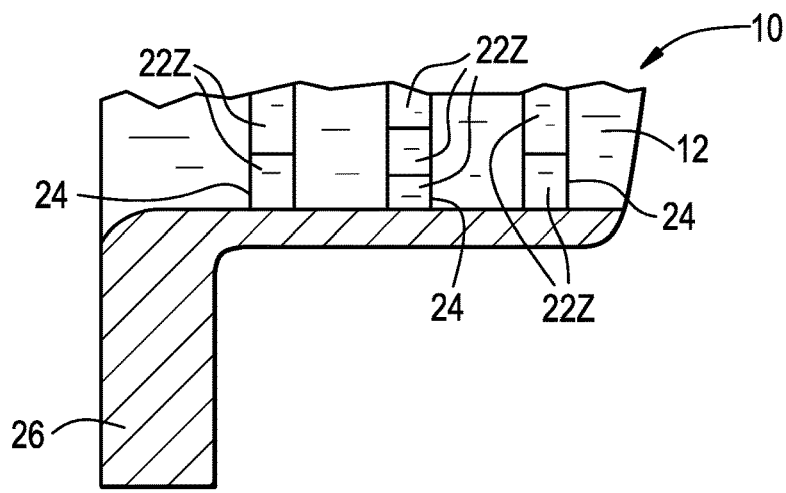
FIG. 8B is a partial side section view of another embodiment of an electrically conductive bushing system according to the present disclosure and having multi-segmented liners.
Figure 8C:
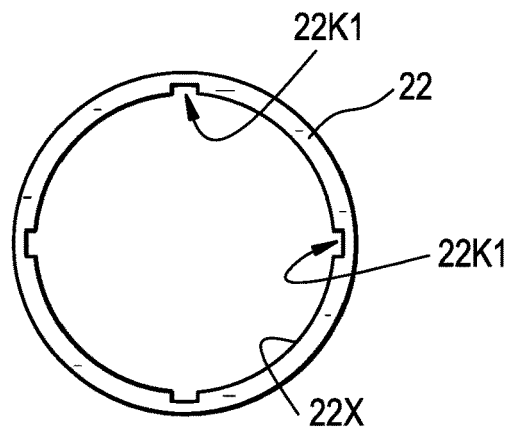
FIG. 8C is a cross sectional view of another embodiment of an electrically conductive bushing system according to FIG. 8A and having liners with axial slits.
Figure 8D:
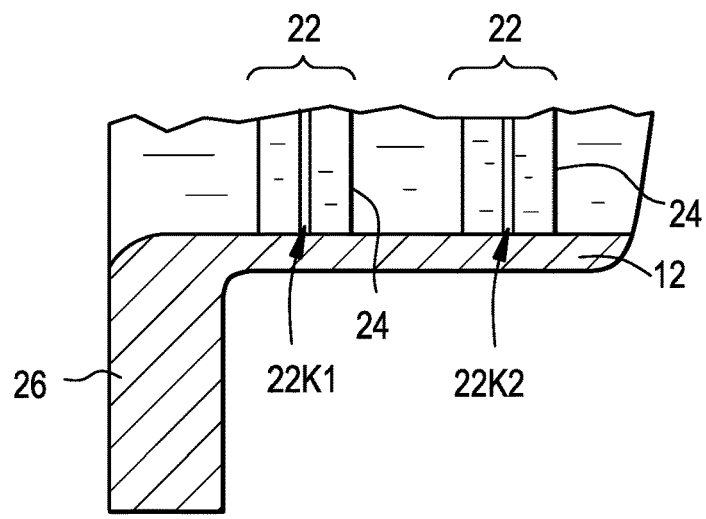
FIG. 8D is a partial side section view of another embodiment of an electrically conductive bushing system according to the present disclosure and having circumferential slits.

While one of the cylindrical recesses 24 with one cylindrical self-lubricating liner 22 is shown and described with reference to FIG. 5, the present invention is not limited in this regard as more than one recess and self-lubricating liner having different cross sections may be employed without departing from the broader aspects of the present invention. For example, FIG. 8 depicts an alternate embodiment of a bushing 10' with more than one self-lubricating liner 22', with each self-lubricating liner 22' disposed in a separate recess 24'. In particular, the cylindrical wall 12' with the first axial end 14' which has the flange 26' and the second axial end 16' is shown in FIG. 8A, which illustrates five distinct bands of the self-lubricating liner 22', each of which are disposed in a respective one of the recesses 24' in the bore 20'. As shown in FIG. 8, the five bands of the self-lubricating liner 22' are equally spaced apart from one another in the respective recesses 24', which are also equally spaced apart from one another. The liner 22' is a self-lubricating liner manufactured from material similar to the liner 22, as disclosed herein.

Figure 8E:
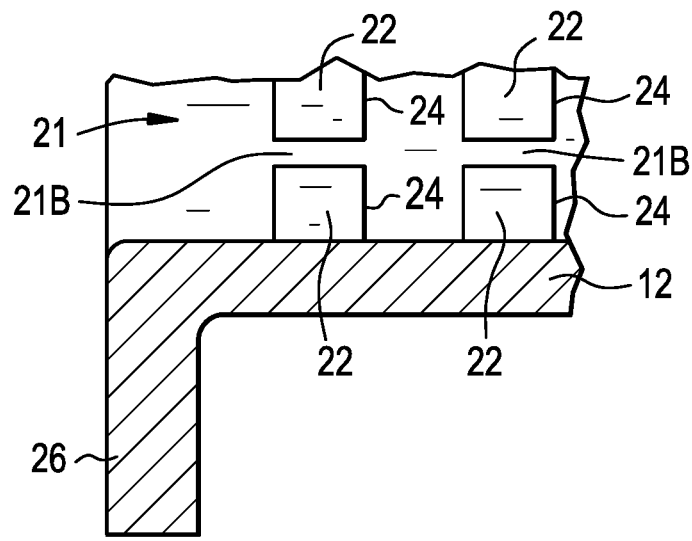
FIG. 8E is a partial side section view of another embodiment of an electrically conductive bushing system according to the present disclosure with recesses interrupted by axially extending bridge portions.

While the cylindrical recess 24 is shown and described as extending continuously (i.e., uninterrupted) circumferentially in the cylindrical wall 12 and the cylindrical self-lubricating liner 22 is shown and described as extending continuously (i.e., uninterrupted) circumferentially in the cylindrical recess 24, the present invention is not limited in this regard, as other configurations may be employed including but not limited to the cylindrical self-lubricating liner 22 being made up of multiple cylindrical segments 22Z (FIG. 8B) disposed in the recess 25, the cylindrical self-lubricating liner 22 having axial slits 22K1 (FIG. 8C) extending through the radially inward facing surface 22X and partially into the cylindrical self-lubricating liner 22, the cylindrical self-lubricating liner 22 having circumferential slits 22K2 (FIG. 8D) extending through the radially inward facing surface 22X and partially into the cylindrical self-lubricating liner 22, and the cylindrical recess 25 may be interrupted by axially extending bridge portions 21B (FIG. 8E).

Referring back to FIG. 5, the cylindrical wall 12 further includes a flange 26 that extends radially outward from the cylindrical wall 12 proximate the first axial end 14. The flange 26 has an axial width T2 measured between an outboard axial surface 27 to an inboard axial surface 28 of the flange 26. The inboard axial surface 29 faces toward the second axial end 16 of the cylindrical wall 12 and the outboard axial surface 27 faces away from the second axial end 16 of the cylindrical wall 12. The inboard axial surface 29 has an annular recess 25 that extends axially into the flange 26 from the inboard axial surface 29 towards the outboard axial surface 27 and terminating therebetween. The annular recess 25 extends continuously (i.e., uninterrupted) in the flange 26. An annular self-lubricating liner 28 is disposed in the annular recess 25. The annular self-lubricating liner 28 has a planar axial bearing surface 28X which is coplanar with the inboard axial surface 29. The annular self-lubricating liner 28 extends continuously circumferentially around and in the annular recess 25.

Figure 8F:
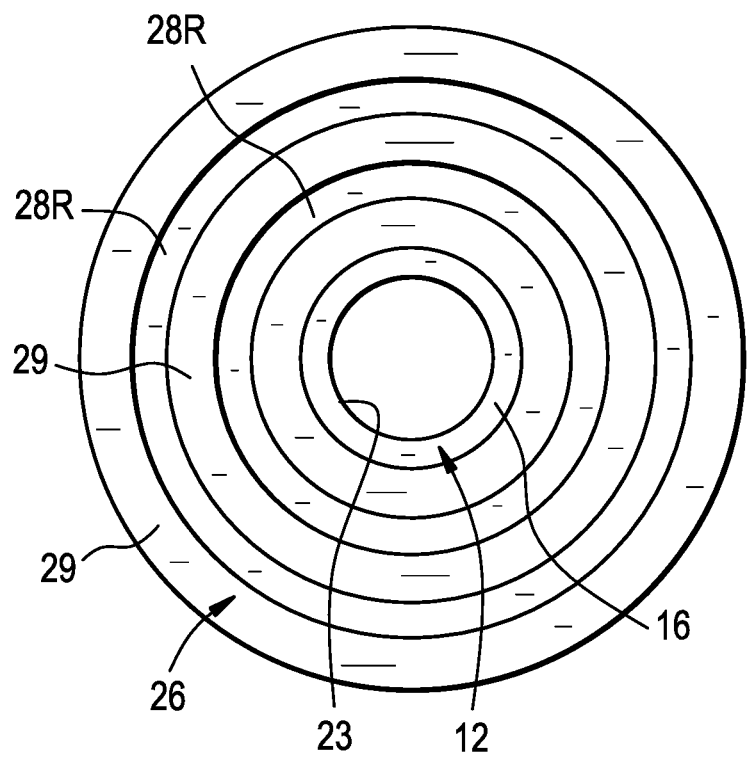
FIG. 8F is an end view of an electrically conductive bushing system according to the present disclosure and having concentrically located recesses and liners.
Figure 8G:
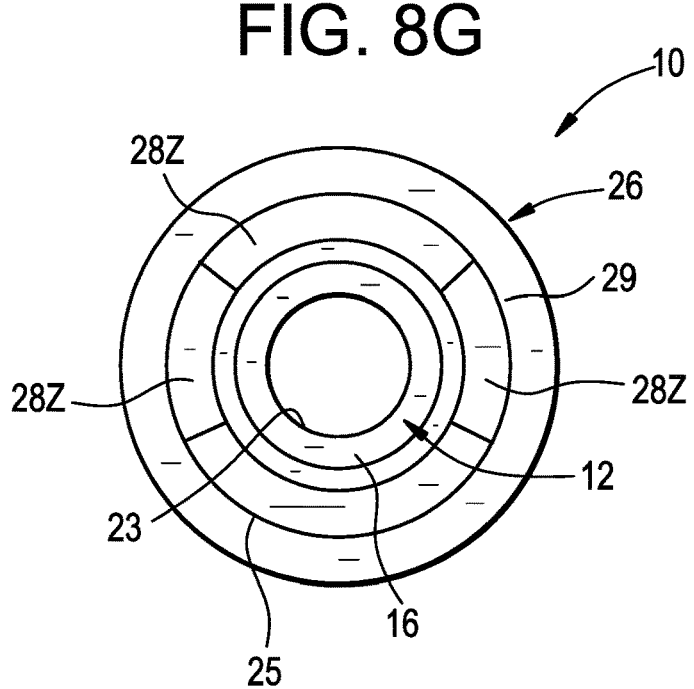
FIG. 8G is and end view of an electrically conductive bushing system according to the present disclosure and having a line with multiple annular segments.
Figure 8H:
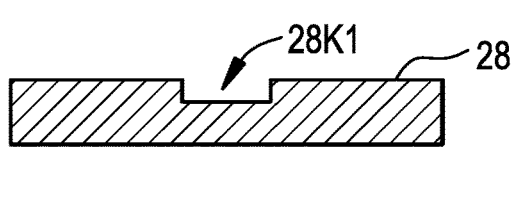
FIG. 8H is a cross sectional view of an annular liner having a radial slit therein.
Figure 8I:
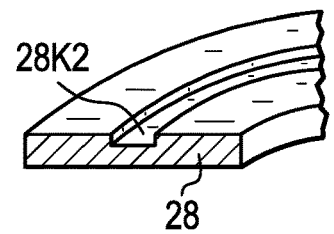
FIG. 8I is a perspective view of an annular liner having a circumferential slit therein.
Figure 8J:
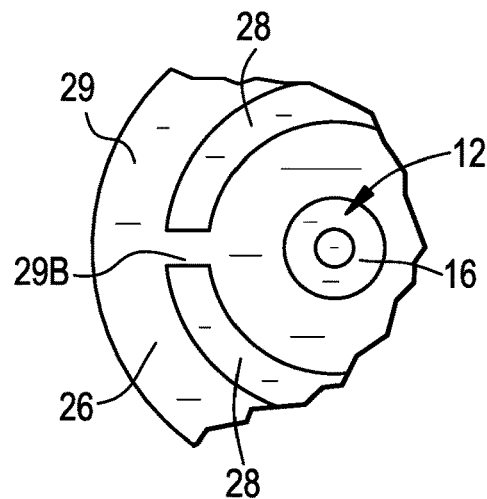
FIG. 8J is an end view of the electrically conductive bushing system according to the present disclosure and having radial extending bridges interrupting the annular recess.

While one annular self-lubricating liner 28 is shown and described as being disposed in the annular recess 25, the present invention is not limited in this regard as the flange 26 may have multiple annular self-lubrication liners each disposed in a respective annular recess. For example, as shown in FIG. 8F the flange 26 has a first annular recess with a self-lubricating coaxial annular liner 28R disposed therein and a second annular recess with another self-lubricating coaxial annular liner 28R disposed therein. While the annular self-lubricating liner 28 is shown and described as extending continuously circumferentially around and in the annular recess 25 and the annular recess 25 is shown and described as extending continuously (i.e., uninterrupted) in the flange 26, the present invention is not limited in this regard as other configurations may be employed including but not limited to the annular self-lubricating liner 28 being made up of multiple coaxial annular liners 28R (FIG. 8F) with multiple annular segments 28Z (FIG. 8G) disposed in the recess 25, the annular self-lubricating liner 28 having radial slits 28K1 (FIG. 8H) extending through the planar axial bearing surface 28X and partially into the annular self-lubricating liner 28, the annular self-lubricating liner 25 having circumferential slits 28K2 (FIG. 8I) extending through the planar axial bearing surface 28X and partially into the annular self-lubricating liner 25, and the annular recess 25 may be interrupted by radially extending bridge portions 29B (FIG. 8J) of the inboard axial surface 29 of the flange 26.

Figure 6:
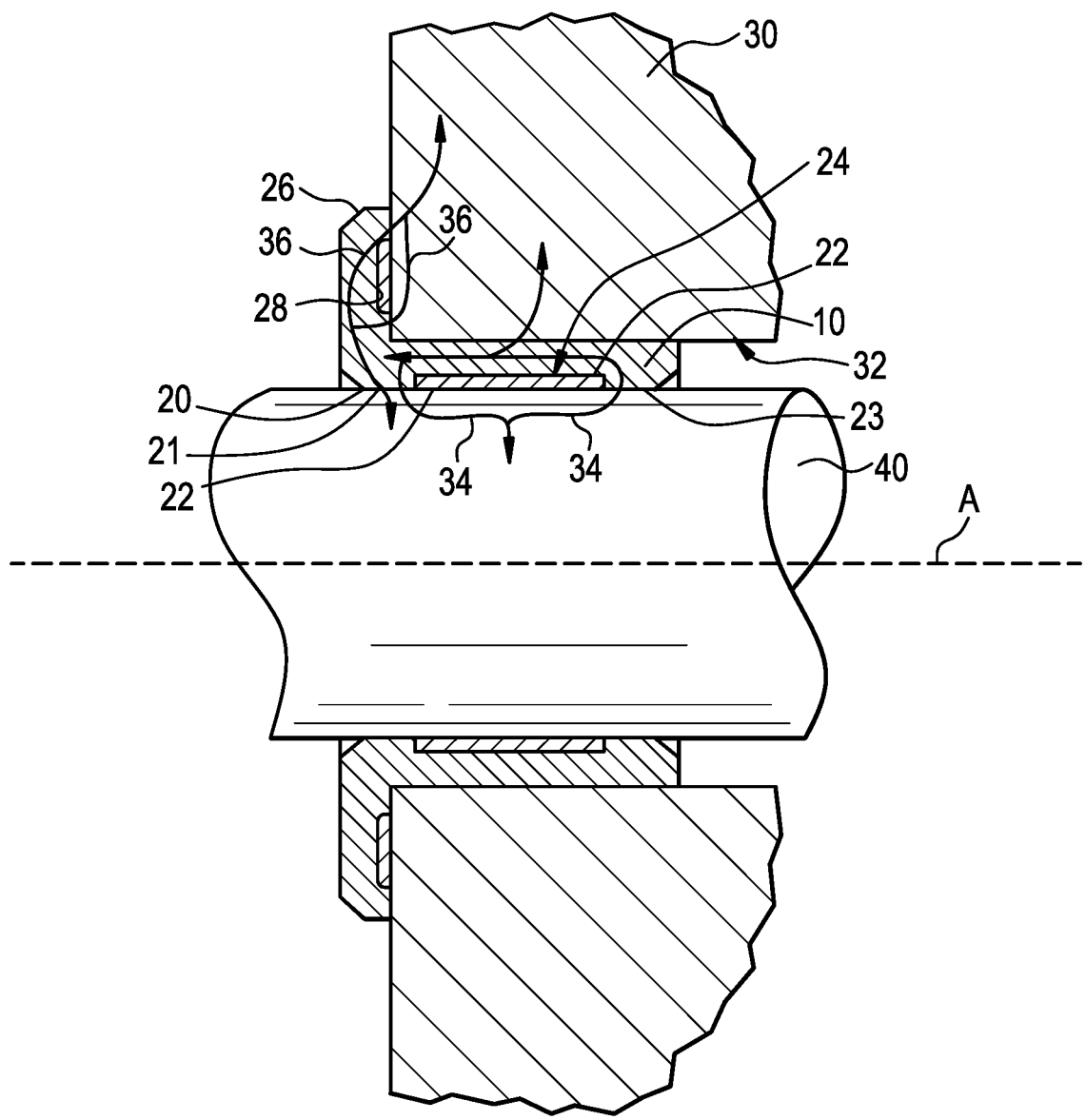
FIG. 6 is a partial side sectional view of the electrically conductive bushing system of FIG. 4 installed in a housing and with a shaft extending therethrough.

As shown in FIG. 6, the bushing system 10 has electrically conductive paths 34, 36 configured to conduct electrical current therethrough. The electrically conductive paths extend around the cylindrical self-lubricating liner 22 and the annular self-lubricating liner 28. The electrically conductive path 34 extends through the cylindrical wall 12 and the electrically conductive path 36 extends through the flange 26.

Figure 2:
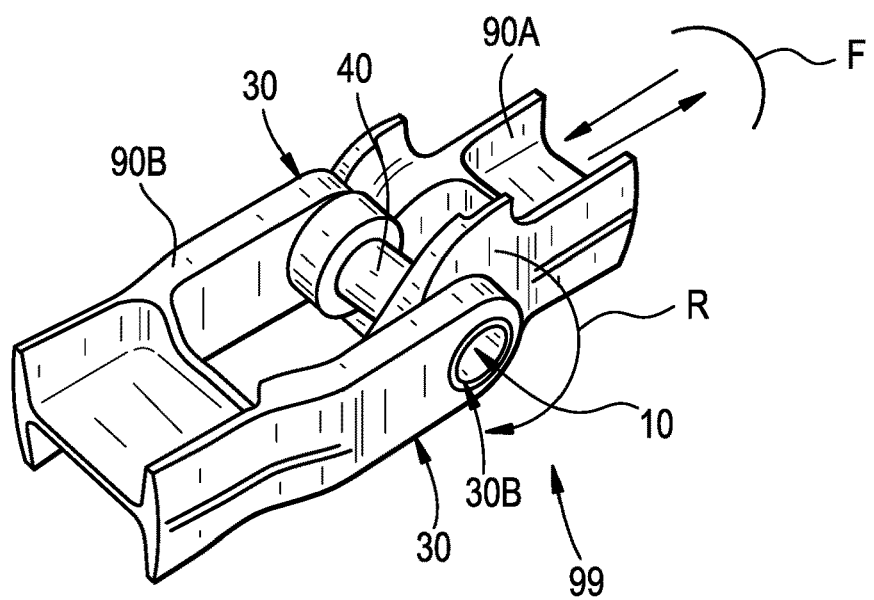
FIG. 2 depicts an isometric partial view of an articulating joint that incorporates one embodiment of the electrically conductive bushing systems according to the present disclosure.
Figure 3:
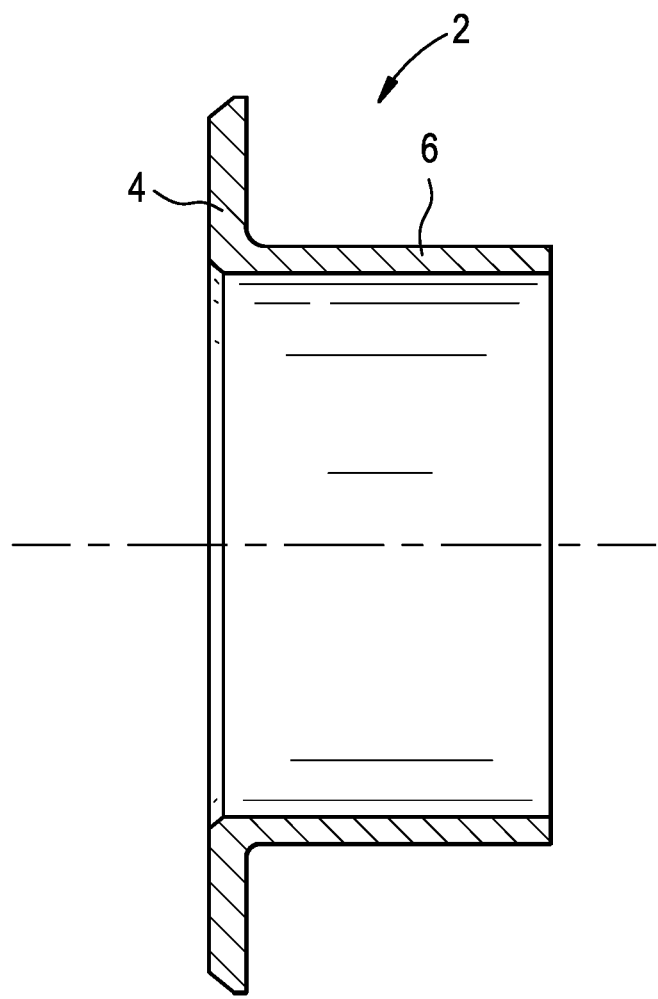
FIG. 3 a side section view of a prior art bushing.

As shown in FIG. 6, the size and location of the cylindrical self-lubricating liner 22 and the annular self-lubricating liner 28 provides adequate lubrication with the shaft 40, while providing the respective electrically conductive path 34, 36 (i.e., through the cylindrical wall 12 and the flange 26) between the shaft 40 and the housing 30 (See FIG. 2). In particular, the first electrically conductive path 34 flows current through the housing 30 to an exterior surface 12E of the cylindrical wall 12, through the cylindrical wall 12 via the interior surfaces 21 and 23 to the shaft 40 and through the shaft 40. A second electrically conductive path 36 flows current through the housing 30, through the flange 26 via the inboard axial surface 29 into the cylindrical wall 12, into the shaft 40 via the interior surfaces 21 and 23 and through the shaft 40. The electrically conductive paths 34, 36 are configured to conduct electrical current that has a voltage equivalent to that of a lightning strike without causing damage to the cylindrical self-lubricating liner 22, the annular self-lubricating liner 28, the cylindrical wall 12 or the flange 26. The electrically conductive paths 34, 36 are also configured to conduct electrical current caused by static electricity, for example, radio signal generated static electricity.

The cylindrical self-lubricating liner 22 and the annular self-lubricating liner 28 are made from a machinable liner or woven fabric liner each including (e.g., infused with) a polytetrafluoroethylene (PTFE) material. One such self-lubricating liner is a Uniflon HP liner manufactured by the Heim division of Roller Bearing Company of America, Inc.

The cylindrical self-lubricating liner 22 and the annular self-lubricating liner 28 provide maintenance-free operation. The bushing system 10 is electrically conductive. The bushing system 10 is not sealed, is not intended to be greased at maintenance intervals (i.e., maintenance-free), and has sufficient electrical conductivity in to provide an electrically conductive path through the bushing system 10 sufficient for a flow of current equal to that of a lightning strike.

Figure 1:
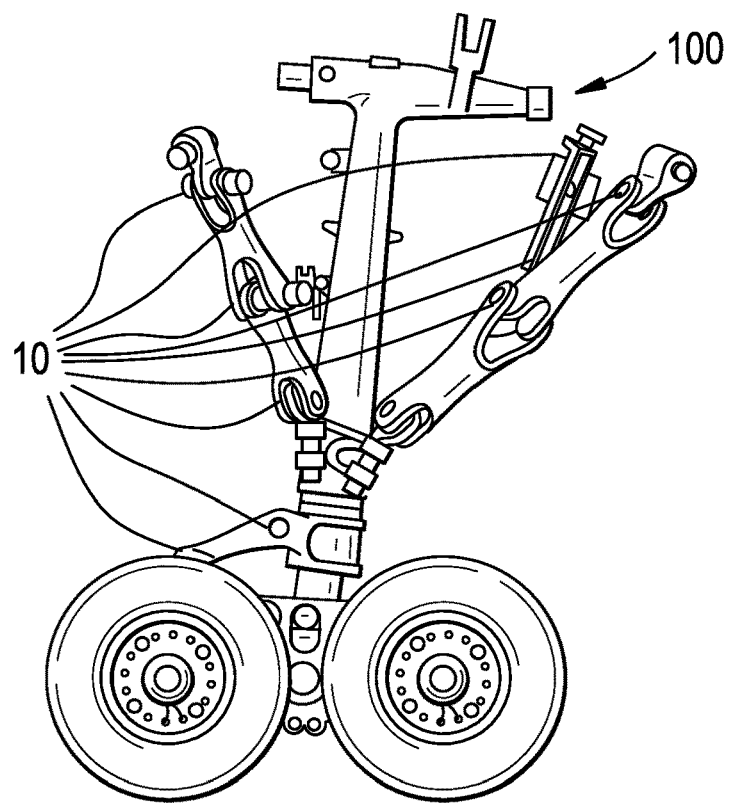
FIG. 1 depicts a landing gear assembly that incorporates one embodiment of an electrically conductive bushing system according to the present disclosure.

Referring to FIG. 1, landing gear assemblies 100 on modern commercial or military aircraft (e.g., Airbus® A-320 aircraft) include twenty or more locations where the bushing systems 10 can be employed. In some embodiments, an external seal is employed over the bushing system 10. The bushing system 10 disclosed herein provides an electrically conductive, maintenance-free or low-maintenance bushing for the aircraft landing gear assemblies 100 (e.g., on the Airbus® A-320 aircraft). The bushing system 10 is configured for use with Boeing® and/or Airbus® A-320 aircraft.

The Airbus® A-320 aircraft have an overall length of 37.57 meters, a cabin length of 27.51 meters, a fuselage width of 3.95 meters, a maximum cabin width of 3.70 meters, a wing span of 35.60 meters, a height of 11.76 meters and a wheel base of 12.64 meters. The Airbus® A-320 has a maximum seating capacity of 194 and has a water volume of 44 cubic meters. The Airbus® A-320 has a range of 6,300 kilometers and has weight of 64.30 tonnes with no fuel. The Airbus® A-320 has a maximum fuel capacity of 26,730 liters. The Airbus® A-320 can be fitted with the PurePower PW1100G-JM from Pratt and Whitney or the LEAP-1A from CFM International.

As shown in FIG. 2, an articulating joint 99 of the landing gear assembly 100 (See FIG. 1) includes a first linkage 90A that is pivotally connected to a second linkage 90B by a shaft 40. One of the bushing systems 10 is disposed in each of two housing bores 30B of opposing housing portions 30 of the second linkage 90B. The shaft 40 is in fixed relation to the first linkage 90A and is in rotational sliding engagement with an inside surface of the bushing systems 10, as described herein. The first linkage 90 and the second linkage 90B are pivotable relative to one another as shown by the arrow R. Axial forces as shown by the arrow F are applied to the articulating joint 99 by the first linkage 90A.

Referring to FIG. 5, the interior surface 21 has a first inside diameter D1 and the interior surface 23 has a second inside diameter D2. The first inside diameter D1 and the second inside diameter D2 are substantially the equal in magnitude. The cylindrical recess 24 has an inside diameter D3. The cylindrical self-lubricating liner 22 has an inside diameter D4 that is substantially the equal in magnitude to the first and second inside diameters D1 and D2, respectively. The cylindrical self-lubricating liner 22 has an outside diameter that is about equal to the inside diameter D3 of the cylindrical recess 24. The radially inward facing surface 22X has an inside diameter D4 that is about equal to the first inside diameter D1 and is about equal to the second inside diameter D2. In some embodiments, the inside diameter D4 has a magnitude that is less than the inside diameter D1 or the inside diameter D2 so that the cylindrical self-lubricating liner 22 is radially spaced apart from the interior surface 21 and/or the interior surface 23. In some embodiments, a recess radial depth ratio of the inside diameter D3 of the cylindrical recess to the inside diameter D1 is between 0.90 and 1.00. In some embodiments, the recess radial depth ratio of the inside diameter D3 of the cylindrical recess to the inside diameter D2 is between 0.90 and 1.00.

Referring to FIG. 5, the self-lubricating liner 22 extends an axial length W1 in the bore between the interior surface 21 and the interior surface 23. The bushing system 10 has an overall axial length W2. The ratio of the axial length W1 of the self-lubricating liner 22 to the overall axial length W2 of the bushing system 10 is approximately 0.55. In some embodiments, the ratio of the axial length W1 of the self-lubricating liner 22 to the overall axial length W2 of the bushing system 10 is between 0.50 and 0.75. In some embodiments, the ratio of the axial length W1 of the self-lubricating liner 22 to the overall axial length W2 of the bushing system 10 is between 0.50 and 0.90.

As shown in FIG. 5, the annular self-lubricating liner 28 has a first axial thickness T1 and the flange has a second axial thickness T2. A ratio of the first axial thickness T1 to the second axial thickness T2 is between about 0.20 and about 0.40.

The radially inward facing surface 22X of the cylindrical self-lubricating liner 22 has a liner circumferential surface area A1 and the interior surfaces 21, 23 collectively have a cylindrical wall circumferential surface area A2. The planar axial bearing surface 28X of annular self-lubricating liner 28 has a liner axial surface area A3. A contact area ratio is defined by the liner circumferential surface area A1 divided by the cylindrical wall circumferential surface area A2. The contact area ratio is about 0.40 to about 0.60. The applicant has surprisingly found that contact area ratio of about 0.40 to about 0.60 provides an optimum amount of self-lubrication while providing sufficient metal to metal electrically conductive contact between the cylindrical wall circumferential surface area A2 and the shaft 40 to conduct electrical current of a magnitude equal to a lightning strike.

The planar axial bearing surface 28X of the annular self-lubricating liner 28 has a liner axial surface area A3 and the inboard axial surface 29 of the flange 16 has flange axial surface area A4. Another contact area ratio is defined by liner axial surface area A3 divided by the flange axial surface area A4. The second contact area ratio is about 0.40 to about 0.80.

In one embodiment the cylindrical wall 12 and flange 16 of the bushing system 10 is made from an electrically conductive material such as a metallic material, for example, an Aluminum-Bronze alloy.

Figure 9:
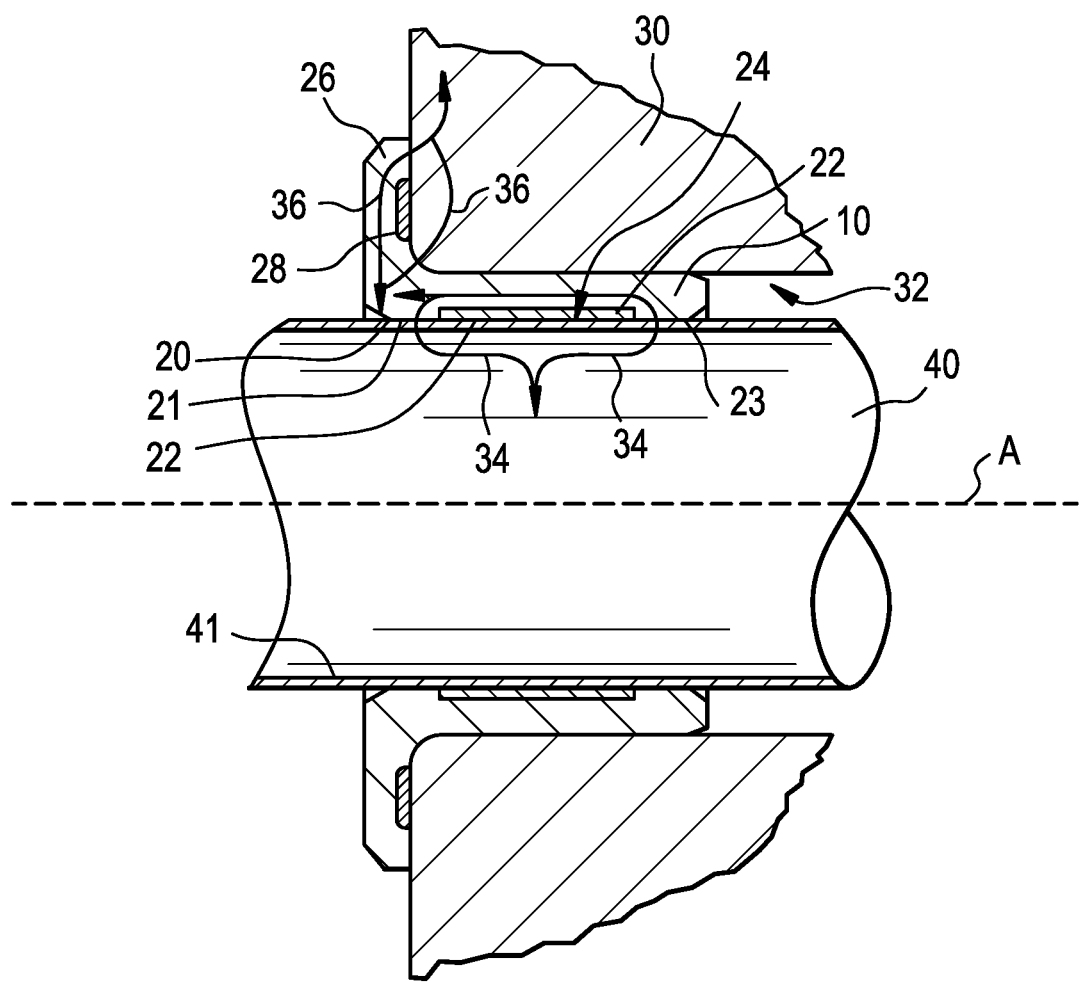
FIG. 9 is a partial side sectional view of the electrically conductive bushing of FIG. 4 installed in a housing with a coated shaft extending therethrough.

As shown in FIG. 9, a shaft 40 has a wear resistant material (e.g., wear resistant coating 41) thereon. In some embodiments, the shaft 40 is manufactured from a steel alloy. In one embodiment, the wear resistant coating 41 is applied via a High Velocity Oxygen Fuel (HVOF) process which is a thermal spray coating process that applies molten materials (or semi-molten materials) at a high speed on substrates, such as the shaft 40. In one embodiment, the wear resistant coating 41 is applied via a physical vapor deposition (PVD) process in which a solid material is vaporized in a vacuum and deposited onto the surface of a part, such as the shaft 40. In one embodiment, the wear resistant coating 41 is applied via a plating process, for example chromium plating. In one embodiment the wear resistant coating 41 is a tungsten carbide material. The wear resistant coating 41 is electrically conductive.

The Applicant has performed wear testing of the bushing system 10 according to SAE standard AS81934, "Bearings, Sleeve, Plain and Flanged, Self-Lubricating, General Specification. SAE Standard AS81934 covers plain and flanged sleeve bearings which are self-lubricating by incorporating polytetrafluoroethylene (PTFE) in a liner in the bore for use in a temperature range of negative 53.89 degrees Celsius (−65F) to 162.78 degrees Celsius (+325F). SAE Standard AS81934 sets forth a maximum allowable wear of 0.01016 cm (0.004) inches. The Applicant has performed wear testing of the bushing system 10 with a shaft 40 therein and without any contaminants.

Figure 10:
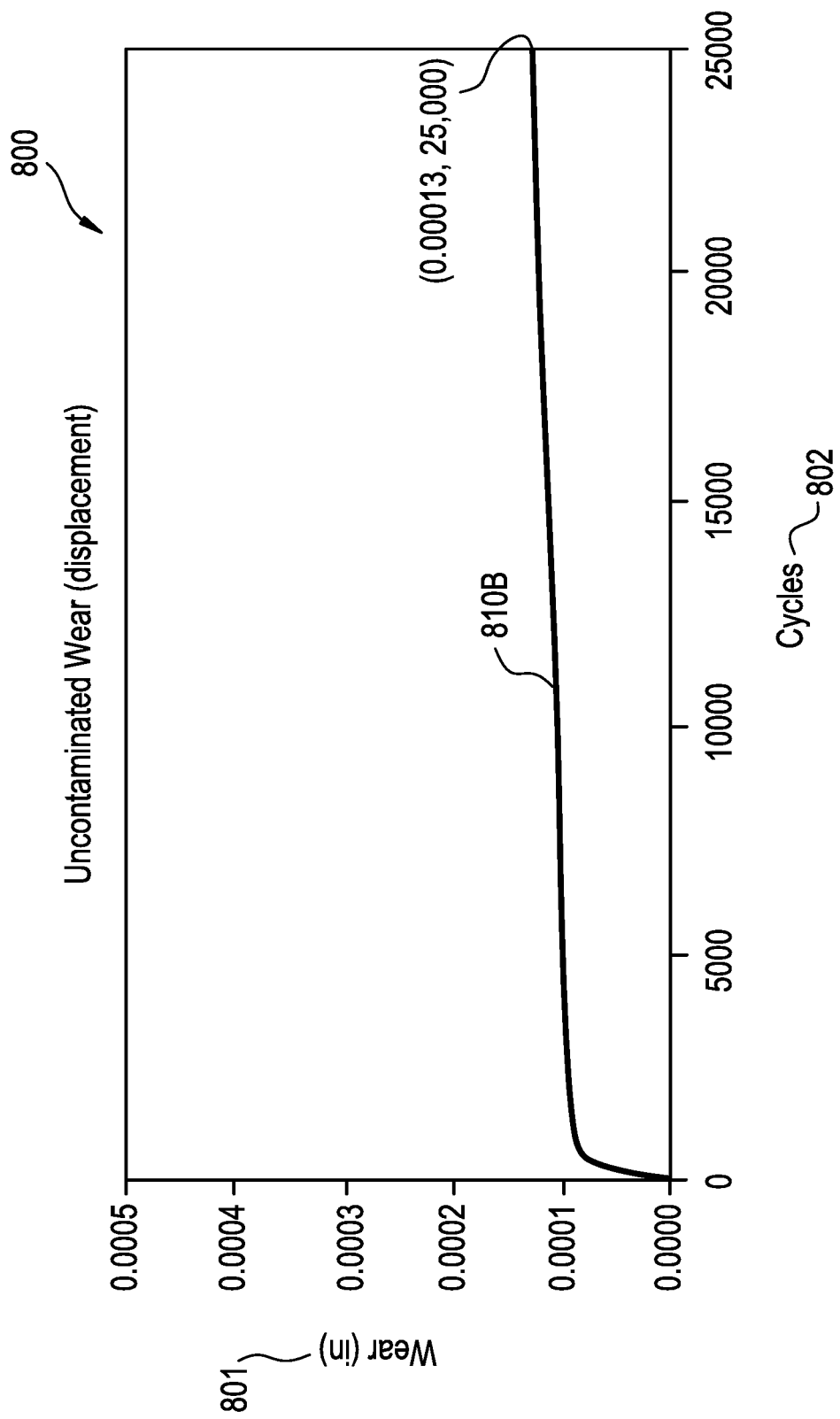
FIG. 10 is a graph that plots bushing wear as function of cycles.

The tests were performed with the bushing systems 10 and uncoated shafts 40 and the bushing systems 10 and shafts 40 with a wear resistant coating 41 thereon. For example, FIG. 10 is a graph 800 that plots wear in centimeters (inches) on the Y-axis 801 (ordinate) and number of cycles on the X-axis 802 (abscissa). The wear test results plotted in the graph 800 are for the bushing 10 with a shaft 40 having a tungsten carbide wear resistant coating thereon. The plot 810B is for a baseline test case in which no contaminants were employed. The plot 810B exhibited about 0.0003302 cm (0.00013) inches of wear in 25,000 cycles, which is 40 times less than the 0.01016 cm (0.004 inches) maximum allowable wear pursuant to SAE Standard AS81934.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A bushing system for aircraft landing gear, the bushing system comprising:
    a cylindrical wall having an interior surface defining a bore extending between a first axial end and a second axial end thereof, and at least one cylindrical recess extending radially outward into the interior surface and located between the first axial end and the second axial end;
    at least one cylindrical self-lubricating liner disposed in the at least one cylindrical recess, a radially inward facing surface of the at least one cylindrical self-lubricating liner being substantially flush with the interior surface defining the bore;
    the cylindrical wall further comprising a flange extending radially outward from the cylindrical wall proximate to the first axial end;
    the flange having an axial width measured between an outboard axial surface and an inboard axial surface of the flange;
    at least one annular recess extending into the inboard axial surface;
    at least one annular self-lubricating liner defining a planar axial bearing surface, the at least one annular self-lubricating liner being disposed in the at least one annular recess;
    the planar axial bearing surface of the at least one annular self-lubricating liner being coplanar with the inboard axial surface;
    an electrically conductive path for conducting electrical current from a lightning strike, the electrically conductive path extending around the at least one cylindrical self-lubricating liner and the at least one annular self-lubricating liner, the electrically conductive path extending through the cylindrical wall and the flange;
    the radially inward facing surface of the at least one cylindrical self-lubricating liner having a liner circumferential surface area, the interior surface having a cylindrical wall circumferential surface area, and the electrically conductive path being defined by a first contact area ratio that is defined by the liner circumferential surface area divided by the cylindrical wall circumferential surface area, the contact area ratio being from about 0.40 to about 0.60; and
    a shaft coated with a tungsten carbide wear resistant coating on at least a portion thereof, the wear resistant coating on the shaft being in rotational sliding engagement with the radially inward facing surface of the at least one cylindrical self-lubricating liner and with the interior surface of the cylindrical wall;
    wherein the interior surface defining the bore further comprises:
        a first interior surface having a first inside diameter;
        a second interior surface having a second inside diameter of a magnitude about equal to that of the first inside diameter; and
        the at least one cylindrical recess having a third inside diameter of a magnitude greater than that of the first inside diameter and greater than that of the second inside diameter;
    wherein a recess radial depth ratio of the first inside diameter to the third inside diameter or of the second inside diameter to the third inside diameter is between 0.90 and 1.00;
    wherein the at least one cylindrical self-lubricating liner has a first axial width and the cylindrical wall has a second axial width and a ratio of the first axial width to the second axial width is from about 0.50 to about 0.90;
    wherein the at least one annular self-lubricating liner has a first axial thickness, the flange has a second axial thickness, and a ratio of the first axial thickness to the second axial thickness is between about 0.20 and about 0.40;
    wherein the planar axial bearing surface of the at least one annular self-lubricating liner has a liner axial surface area, the inboard axial surface of the flange has a flange axial surface area and a second contact area ratio is defined by the liner axial surface area divided by the flange axial surface area, the second contact area ratio being from about 0.40 to about 0.80;
    wherein at least one of the cylindrical self-lubricating liner and the at least one annular self-lubricating liner comprises Polytetrafluoroethylene (PTFE) or has PTFE fibers woven therein; and
    wherein the bushing system has a maximum wear of 0.0003302 cm (0.00013 inches) after 25,000 cycles of operation in a temperature range of negative 53.89 degrees Celsius (negative 65 degrees Fahrenheit) to 162.78 degrees Celsius (+325 degrees Fahrenheit).

2. The bushing system of claim 1, wherein the first interior surface has a first axial length, the second interior surface has a second axial length, and the first axial length and the second axial length have substantially equal magnitudes.

3. The bushing system of claim 1, wherein the at least one cylindrical self-lubricating liner extends entirely circumferentially within the bore.

4. The bushing system of claim 1, wherein the at least one cylindrical self-lubricating liner extends intermittently within the bore.

5. The bushing system of claim 1 installed in landing gear of an Airbus® A-320 aircraft.

6. The bushing system of claim 1, wherein the cylindrical wall and the flange comprise an aluminum-bronze alloy material.

7. An aircraft landing assembly, comprising:
a landing assembly housing defining a housing bore; and
a bushing system according to claim 1 arranged in the landing assembly such that the bushing is retained in the housing bore;
wherein the electrically conductive path further extends through the housing.

\* \* \* \* \*